(12) United States Patent
    Narasimhan et al.

(10) Patent No.: US 11,425,357 B2
(45) Date of Patent: Aug. 23, 2022

(54) METHOD FOR EPIPOLAR TIME OF FLIGHT IMAGING

(71) Applicants: CARNEGIE MELLON UNIVERSITY, Pittsburgh, PA (US); THE GOVERNING COUNCIL OF THE UNIVERSITY OF TORONTO, Toronto (CA)

(72) Inventors: Srinivasa Narasimhan, Pittsburgh, PA (US); Supreeth Achar, Pittsburgh, PA (US); Kiriakos Kutulakos, Pittsburgh, PA (US); Joseph Bartels, Pittsburgh, PA (US); William Whittaker, Pittsburgh, PA (US)

(73) Assignees: CARNEGIE MELLON UNIVERSITY, Pittsburgh, PA (US); THE GOVERNING COUNCIL OF THE UNIVERSITY OF TORONTO, Tornonto (CA)

( * ) Notice: Subject to any disclaimer, the term of this patent is extended or adjusted under 35 U.S.C. 154(b) by 163 days.

(21) Appl. No.: 16/468,617

(22) PCT Filed: Jan. 19, 2018

(86) PCT No.: PCT/US2018/014369
    § 371 (c)(1),
    (2) Date: Jun. 11, 2019

(87) PCT Pub. No.: WO2018/136709
    PCT Pub. Date: Jul. 26, 2018

(65) Prior Publication Data
    US 2020/0092533 A1    Mar. 19, 2020

Related U.S. Application Data

(63) Continuation-in-part of application No. 15/545,391, filed as application No. PCT/US2016/017942 on Feb. 15, 2016, now Pat. No. 10,359,277.
(Continued)

(51) Int. Cl.
    *H04N 13/254*    (2018.01)
    *H04N 13/296*    (2018.01)
    (Continued)

(52) U.S. Cl.
    CPC ......... *H04N 13/254* (2018.05); *G01S 7/4914* (2013.01); *G01S 17/894* (2020.01); *H04N 13/211* (2018.05); *H04N 13/296* (2018.05)

(58) Field of Classification Search
    None
    See application file for complete search history.

(56) References Cited

U.S. PATENT DOCUMENTS

| 4,621,185 A | 11/1986 | Brown |
| 4,687,325 A * | 8/1987 | Corby, Jr. ............... G01B 11/25 |
| | | 356/2 |

(Continued)

FOREIGN PATENT DOCUMENTS

| JP | 2002039716 A | 2/2002 |
| JP | 2012168049 A | 9/2012 |

(Continued)

OTHER PUBLICATIONS

International Search Report and Written Opinion for International application No. PCT/US2018/014369, dated Apr. 26, 2018, 8 pages.
(Continued)

*Primary Examiner* — Stefan Gadomski
(74) *Attorney, Agent, or Firm* — KDB Firm PLLC

(57) ABSTRACT

Energy-efficient epipolar imaging is applied to the ToF domain to significantly expand the versatility of ToF sen-
(Continued)

sors. The described system exhibits 15+ m range outdoors in bright sunlight; robustness to global transport effects such as specular and diffuse inter-reflections; interference-free 3D imaging in the presence of many ToF sensors, even when they are all operating at the same optical wavelength and modulation frequency; and blur- and distortion-free 3D video in the presence of severe camera shake. The described embodiments are broadly applicable in consumer and robotics domains.

20 Claims, 10 Drawing Sheets

Related U.S. Application Data

(60) Provisional application No. 62/499,193, filed on Jan. 20, 2017, provisional application No. 62/176,352, filed on Feb. 13, 2015.

(51) Int. Cl.
  *G01S 17/894* (2020.01)
  *G01S 7/4914* (2020.01)
  *H04N 13/211* (2018.01)

(56) References Cited

U.S. PATENT DOCUMENTS

| | | | |
|---|---|---|---|
| 4,687,326 A * | 8/1987 | Corby, Jr. | G01B 11/2536 348/169 |
| 5,128,753 A | 7/1992 | Lemelson | |
| 5,717,390 A | 2/1998 | Hasselbring | |
| 5,852,672 A * | 12/1998 | Lu | G01B 11/2441 382/154 |
| 6,043,905 A | 3/2000 | Kato | |
| 6,529,627 B1 | 3/2003 | Callari et al. | |
| 6,556,307 B1 | 4/2003 | Norita et al. | |
| 8,400,494 B2 | 3/2013 | Zalevsky et al. | |
| 9,500,477 B2 | 11/2016 | Lee et al. | |
| 9,536,320 B1 | 1/2017 | Prince | |
| 9,838,611 B2 | 12/2017 | Haraguchi | |
| 10,021,284 B2 | 7/2018 | Wang et al. | |
| 10,145,678 B2 | 12/2018 | Wang et al. | |
| 2001/0035636 A1 | 11/2001 | Adachi | |
| 2002/0014533 A1* | 2/2002 | Zhu | G06K 7/10673 235/472.01 |
| 2004/0151345 A1* | 8/2004 | Morcom | G01S 17/931 382/104 |
| 2006/0132752 A1* | 6/2006 | Kane | G01S 17/42 356/5.02 |
| 2007/0242872 A1* | 10/2007 | Rudin | G06K 9/00664 382/154 |
| 2008/0123939 A1* | 5/2008 | Wieneke | G06T 7/80 382/154 |
| 2009/0066929 A1* | 3/2009 | Tropf | G01B 11/2513 356/3.12 |
| 2009/0201486 A1* | 8/2009 | Cramblitt | G01S 17/89 356/4.01 |
| 2010/0074532 A1 | 3/2010 | Gordon et al. | |
| 2010/0085425 A1* | 4/2010 | Tan | H04N 13/363 348/54 |
| 2010/0128221 A1 | 5/2010 | Muller et al. | |
| 2010/0303299 A1 | 12/2010 | Cho et al. | |
| 2011/0102763 A1* | 5/2011 | Brown | G01S 7/481 356/4.01 |
| 2011/0235018 A1* | 9/2011 | Mori | G01S 7/4817 356/5.01 |
| 2011/0292347 A1 | 12/2011 | Zhang et al. | |
| 2011/0299135 A1 | 12/2011 | Takabatake | |
| 2011/0317005 A1* | 12/2011 | Atkinson | H04N 5/33 348/135 |
| 2012/0008128 A1* | 1/2012 | Bamji | G01S 17/36 356/5.01 |
| 2012/0062705 A1 | 3/2012 | Ovsiannikov et al. | |
| 2012/0062963 A1* | 3/2012 | Gillham | G01S 7/4814 358/474 |
| 2012/0200829 A1 | 8/2012 | Bronstein et al. | |
| 2013/0010087 A1* | 1/2013 | Nieten | H04N 13/211 348/50 |
| 2013/0021474 A1* | 1/2013 | Taylor | G01S 7/4817 348/144 |
| 2013/0127854 A1 | 5/2013 | Shpunt et al. | |
| 2014/0055771 A1* | 2/2014 | Oggier | G01S 17/894 356/5.01 |
| 2014/0055779 A1 | 2/2014 | Enami | |
| 2014/0111616 A1 | 4/2014 | Blayvas | |
| 2014/0125775 A1* | 5/2014 | Holz | H04N 13/218 348/49 |
| 2014/0232566 A1 | 8/2014 | Mimeault et al. | |
| 2014/0247323 A1 | 9/2014 | Griffis et al. | |
| 2014/0328535 A1* | 11/2014 | Sorkine-Hornung | G06T 5/00 382/154 |
| 2015/0067929 A1 | 3/2015 | Blanton et al. | |
| 2015/0176977 A1 | 6/2015 | Abele et al. | |
| 2015/0177506 A1* | 6/2015 | Nishiwaki | H04N 13/239 348/46 |
| 2015/0215547 A1 | 7/2015 | Muller | |
| 2015/0281671 A1 | 10/2015 | Bloom et al. | |
| 2015/0285618 A1 | 10/2015 | Haraguchi | |
| 2015/0285625 A1* | 10/2015 | Deane | G01S 7/4863 348/140 |
| 2015/0294496 A1 | 10/2015 | Medasani et al. | |
| 2015/0362698 A1* | 12/2015 | Lansel | G06T 7/20 348/360 |
| 2016/0041266 A1* | 2/2016 | Smits | G01S 7/497 356/5.01 |
| 2016/0065945 A1* | 3/2016 | Yin | G01B 11/2518 348/47 |
| 2016/0124203 A1 | 5/2016 | Ryu | |
| 2016/0198147 A1* | 7/2016 | Waligorski | G01S 7/4914 348/49 |
| 2016/0209183 A1 | 7/2016 | Bakken et al. | |
| 2016/0335778 A1* | 11/2016 | Smits | G01P 3/36 |
| 2016/0349369 A1 | 12/2016 | Lee et al. | |
| 2017/0064235 A1* | 3/2017 | Wang | G01S 17/10 |
| 2017/0127036 A1* | 5/2017 | You | G01S 17/894 |
| 2017/0142406 A1* | 5/2017 | Ovsiannikov | H04N 13/296 |
| 2017/0272726 A1* | 9/2017 | Ovsiannikov | G01C 25/00 |
| 2017/0310948 A1* | 10/2017 | Pei | G01S 7/4816 |
| 2017/0353707 A1* | 12/2017 | Wang | G01S 7/4863 |
| 2017/0366801 A1* | 12/2017 | Horesh | H04N 13/296 |
| 2018/0246189 A1 | 8/2018 | Smits | |
| 2018/0252800 A1* | 9/2018 | Morcom | G01S 17/10 |
| 2018/0307310 A1* | 10/2018 | McCombe | H04N 13/243 |
| 2019/0025986 A1* | 1/2019 | Yamauchi | G06F 3/0421 |
| 2019/0236796 A1 | 8/2019 | Blasco Claret et al. | |

FOREIGN PATENT DOCUMENTS

| | | | | |
|---|---|---|---|---|
| JP | 2015513825 A | 5/2015 | | |
| WO | WO-03016982 A2 * | 2/2003 | | H04N 5/74 |
| WO | 2015003108 A1 | 1/2015 | | |
| WO | WO-2015119872 A1 * | 8/2015 | | H04N 5/33 |
| WO | 2016/131036 A1 | 8/2016 | | |

OTHER PUBLICATIONS

Extended European search report for EP Application No. 18742111. 0, dated Jul. 10, 2020, 6 pages.
International Search Report and Written Opinion for International Application No. PCT/US2018/014369, dated Apr. 26, 2018.
Achar, S. et al., "Epipolar Time-of-Flight Imaging." ACM Transactions on Graphics, 36(4) Article 37 (2017) 8 pages.
Barry, A.J., et al, "Pushbroom Stereo for High-Speed Navigation in Cluttered Environments", IEEE International Conference on Robotics and Automation (ICRA), pp. 3046-3052, (May 26-30, 2015).

(56) References Cited

OTHER PUBLICATIONS

Blais, F., "Review of 20 Years of Range Sensor Development", Journal of Electronic Imaging, 13(1): 231-240, Jan. 2004.
Extended European Search Report for Application No. EP19772623.5, dated Oct. 22, 2021, 7 pages.
Heckman, P. J., "Underwater Range Gated Photography", Proc. SPIE 0007, Underwater Photo Optics I, Jun. 1, 1966, [online] [retrieved on Jan. 28, 2019]. Retrieved from Internet URL: https://www.spiedigitallibrary.org/conference-proceedings-of-spie.
International Preliminary Report and Written Opinion for International Application No. PCT/US2016/017942, dated Aug. 15, 2017, 10 pages.
International Search Report and Written Opinion for International application No. PCT/US16/17942, dated May 19, 2016, 11 pages.
International Search Report and Written Opinion for International application No. PCT/US19/21569, dated May 24, 2019, 10 pages.
International Search Report and Written Opinion for International application No. PCT/US19/052854 dated Jul. 15, 2020, 8 pages.
Jarvis, R. A., "A Perspective on Range Finding Techniques for Computer Vision", IEEE Transactions On Pattern Analysis and Machine Intelligence, vol. PAMI-5, No. 2, pp. 122-139, Mar. 1983.
O'Toole et al. "3D Shape and Indirect Appearance by Structured Light Transport", Proceedings of the IEEE Conference on Computer Vision and Pattern Recognition (CVPR), 2014, pp. 3246-3253.
O'Toole, M., et al., "Homogeneous Codes for Energy-Efficient Illumination and Imaging", ACM Transactions on Graphics Article 35 (2015) 13 pages.
O'Toole et al. "Prima-Dual Coding to Probe Light Transport." ACM Transactions on Graphics, vol. 31, No. 4, Article 39, Publication Date: Jul. 2012.
Tadano, R., et al., "Depth Selective Camera: A Direct, On-chip, Programmable Technique for Depth Selectivity in Photography", IEEE International Conference on Computer Vision (2015) 9 pages.
Wang, J. et al., "Programmable Triangulation Light Curtains." ECCV Computer Vision Foundation, 2018, pp. 1-16.
Communication pursuant to Article 94(3) EPC for European Patent Application No. 18742111.0, dated Dec. 16, 2021, 5 pages.

\* cited by examiner

METHOD FOR EPIPOLAR TIME OF FLIGHT IMAGING

RELATED APPLICATIONS

This application is a national phase filing under 35 U.S.C. § 371 claiming the benefit of and priority to International Patent Application No. PCT/US2018/014369, filed on Jan. 19, 2018, which claims the benefit of U.S. Provisional Patent Application Ser. No. 62/499,193, filed Jan. 20, 2017. This application is a Continuation-In-Part of U.S. patent application Ser. No. 15/545,391, which is a national phase filing under 35 U.S.C. § 371 claiming the benefit of and priority to International Patent Application No. PCT/US2016/017942, filed on Feb. 15, 2016, which claims the benefit of U.S. Provisional Patent Application Ser. No. 62/176,352, filed Feb. 13, 2015. The entire contents of these applications are incorporated herein by reference.

GOVERNMENT RIGHTS

This invention was made with government support under N000141512358 awarded by the ONR, 11S1317749 awarded by the NSF, HR00111620021 awarded by DARPA, and grants NNX16AD98G and NNX14AM53H awarded by NASA. The government has certain rights in the invention.

BACKGROUND OF THE INVENTION

Time-of-flight (ToF) depth sensors have become the technology of choice in diverse applications, from automotive and aviation to robotics, gaming and consumer electronics. These sensors come in two general flavors: LIDAR-based systems that rely on extremely brief pulses of light to sense depth, and continuous-wave (CW) systems that emit a modulated light signal over much longer duration. The LIDAR-based systems can acquire centimeter-accurate depth maps up to a kilometer away in broad daylight, but have low measurement rates. Additionally, the cost per pixel is orders of magnitude higher than CW systems, whose range, outdoor operation and robustness are extremely limited. Because low cost, large-scale production and high measurement rate often trump other considerations, continuous-wave time-of-flight (CW-ToF) sensors continue to dominate the consumer electronics and low-end robotics space despite their shortcomings. Further, consumer grade time-of-flight depth cameras like Kinect and PMD are cheap, compact and produce video-rate depth maps in short-range applications.

SUMMARY OF THE INVENTION

The present invention significantly reduces the shortcomings of CW-ToF through the use of energy-efficient epipolar imaging. In certain embodiments, a continuously-modulated sheet of laser light is projected along a sequence of carefully chosen epipolar planes that collectively span the field of view. For each projected sheet, only a strip of CW-ToF pixels corresponding to each epipolar plane is exposed. As shown in FIG. 2, a prototype implementation of the invention couples a specially built projection system to a CW-ToF sensor that has a controllable region of interest. In some embodiments, an off-the-shelf CW-ToF sensor may be used. The off-the-shelf sensor may output live 320×240 3D video at 7.5 frames per second, with the frame rate only limited by the sensor's API.

Epipolar imaging was first proposed for acquiring live direct-only or global-only video with a conventional (non-ToF) video sensor. The approach has been extended to the ToF domain, but its energy efficiency is very low and it involves capturing more than 500 images to calculate a single "direct-only" ToF image. In the context of triangulation-based 3D imaging, significant improvements in energy efficiency and robustness can be achieved with a 2D scanning-laser projector and a rolling shutter camera. The present invention extends this idea to the ToF domain. As such, it inherits all the advantages of non-ToF energy-efficient epipolar imaging while also addressing challenges that are specific to CW-ToF.

The primary difficulty is that the range of CW-ToF sensors is severely limited by power consumption and eye safety considerations. Although most CW-ToF sensors electronically subtract the DC component of incident light, photon noise from strong ambient sources such as sunlight can easily overwhelm the CW-ToF signal at distances of more than a few meters outdoors at typical frame rates. By concentrating the energy of the light source into a single sheet, epipolar ToF boosts this range to 10 m and acquires a useful, albeit noisier, depth signal at over 15 m outdoors.

A secondary difficulty is that the depth accuracy of CW-ToF sensors is strongly affected by global illumination effects, such as inter-reflections and global illumination transport. These effects produce longer light paths and show up as a source of structured additive noise. These effects cannot be cancelled a posteriori without imposing strong assumptions on the scene's geometry and reflectance properties, yet are extremely common indoors (e,g., corners between walls, shiny surfaces of tables and floors, mirrors, etc.). The present invention demonstrates significant robustness to all forms of global transport, and to specular inter-reflections in particular, a form of global illumination transport that has never been possible to handle in live CW-ToF.

As devices equipped with CW-ToF depth sensors become increasingly common indoors and outdoors, they must be able to operate without interfering with each other. While non-interference between devices of a given make and model can be achieved by varying modulation frequency across them, robustness against the broader ecosystem of CW-ToF sensors is desirable. The present invention demonstrates that epipolar ToF enables interference-free live 3D imaging, even for devices that have the exact same modulation frequency and light source wavelength.

Lastly, CW-ToF sensors must acquire two or more frames with a different phase of emitted light to compute a single depth map. This makes them highly sensitive to camera shake, unlike conventional cameras where shaking merely blurs the image, camera shake in CW-ToF causes the static-scene assumption to be violated, leading to depth maps that are both blurry and corrupted by motion artifacts. Epipolar ToF makes it possible to address both problems: motion blur is minimized by relying on very short exposures for each epipolar plane, motion artifacts and depth errors are minimized by acquiring multiple phase measurements per epipolar plane, rather than per frame and rolling-shutter-like distortions due to the sequential nature of epipolar-plane ToF are reduced by scheduling the sequence of epipolar planes so that post-acquisition distortion correction becomes easier.

BRIEF DESCRIPTION OF THE DRAWINGS

FIG. 4(*b*) depicts the laser light source components.

FIG. 8 shows that epipolar ToF imaging provides accurate depth returns from the surface of the light bulbs even when they are turned on.

DETAILED DESCRIPTION

The term microcontroller, as used herein, may mean a dedicated hardware device, circuitry, an ASIC, an FPGA, a microprocessor running software, or any other means known in the art. It is further understood that the microcontroller will include connections to both the sensor and the laser light projector for sending control signals, and for receiving data. The invention is not intended to be limited to one method of implementing the functions of the controller.

As used herein, the terms camera and sensor are used interchangeably.

Continuous Wave Time of Flight

CW-ToF cameras use a temporally modulated light source and a sensor where the exposure is also modulated during integration. If the illumination modulation function is $f_\omega t = \cos(\omega t)$ and the sensor modulation function is $g_{\omega,\phi}(t) = \cos(\omega t + \phi)$ where $\omega$ is the modulation frequency in rad/s and $\phi$ is the phase offset between the source and sensor modulation functions, then the measurement at a pixel x is:

$$I_{\omega,\sigma}(x) = \int_o^T f_\omega(t) * [h_x(t) + A_x] g_{\omega,\sigma}(t) dt \quad (1)$$

$$= \frac{T}{2} \int_0^\infty \cos(\omega \tau - \phi) h_x(\tau) d\tau \quad (2)$$

where $h_x(t)$ represents a pixel's transient response to the active light source and $A_x$ is the light received due to ambient light and the DC component of the active light source. Although, $A_x$ drops out of the integral, in practice, $I_{\omega,\phi}(x)$ is measured by integrating the incoming light to two different storage sites (called taps) depending on whether $g_{\omega,\phi}(t)$ is positive or negative and then taking the difference between the stored values so the ambient light still adds to the measurement shot noise.

If there are no indirect light paths between the light source and sensor pixel x, then $h_x(t) \propto \delta(t-l(x)/c)$ where c is the speed of light and l(x) is the length of the path from the light source to the scene point corresponding to x and back to the sensor.

Assuming the scene is static, the path length l(x) can be recovered by capturing a pair of images at the same frequency but two different modulation phases $\phi=0$ and $\phi=\pi/2$:

$$l(x) = \frac{c}{2\omega} a\tan2\left(I_{\omega,\frac{\pi}{2}}(x), I_{\omega,0}(x)\right) \quad (3)$$

The pixel depth z(x) can be computed from l(x)) using the geometric calibration parameters of the light source and sensor.

Epipolar Time of Flight

Figure 2:
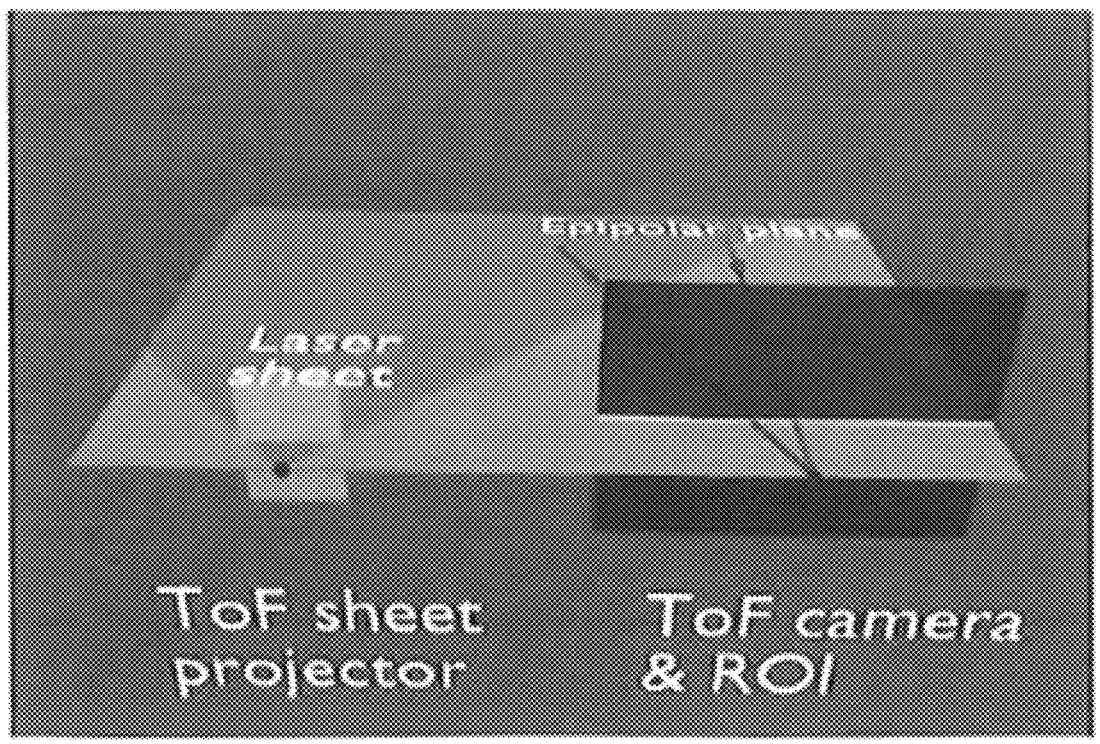
FIG. 2 is a schematic view of a system for performing epipolar ToF imaging.

FIG. 2 is a schematic view of a system for performing epipolar ToF imaging. A projector that generates a steerable sheet of modulated laser light is combined with a ToF sensor whose rows can be exposed one at a time. The projector and sensor are placed in a rectified stereo configuration so that the light sheet always lies in an epipolar plane between the projector and the camera. At any given instant, only the row of camera pixels in the epipolar plane are exposed to light.

Figure 4A:
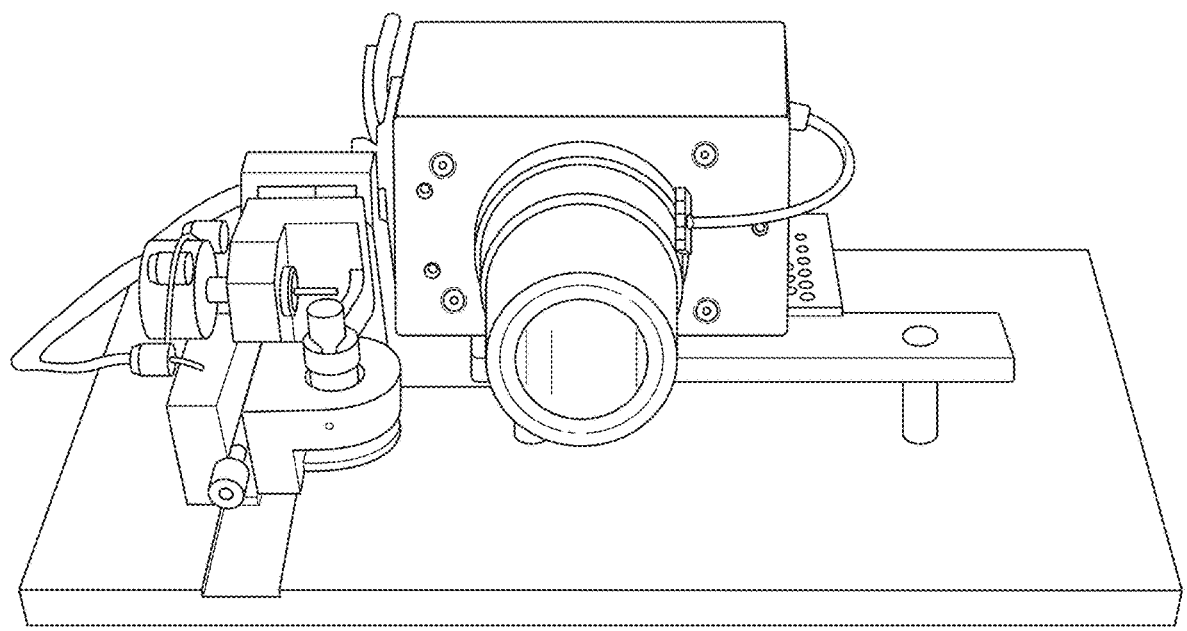
FIG. 4(*a*) is a depiction of the prototype of the present application.
Figure 4B:
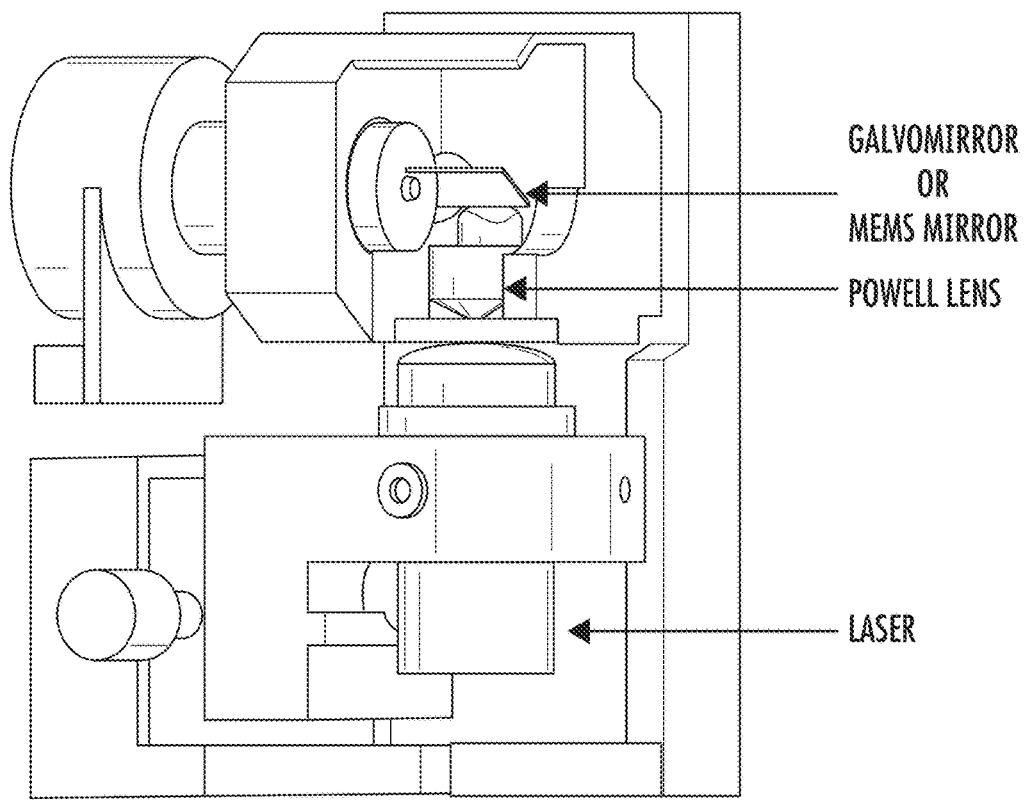

To realize the geometry of FIG. 2, a line laser source with a 1D scanning mirror that projects a steerable light sheet out onto the scene is used, as shown in FIG. 4(*b*). No current CW-ToF sensor provides controllable exposure coding across the 2D pixel array. Taking into account available off-the-shelf hardware, there are three ways to restrict exposure to pixels on an epipolar plane:

1. use a digital micro-mirror device (DMD) to mask all other pixels;
2. use a 1D sensor and a controllable mirror to select the epipolar plane it should image; or
3. use a 2D sensor with a controllable region of interest (ROI).

In a preferred embodiment, the third option is chosen because it is more light-efficient than using a DMD mask, and it leads to a simpler design. The ROI is set to one row tall to match the requirements of epipolar ToF.

Epipolar Plane Sampling

CW-ToF requires at least two images to recover depth. To cover an entire scene using epipolar ToF, the active epipolar plane must be swept across the field-of-view. This offers flexibility to choose the order by which epipolar planes are sampled.

Figure 3:
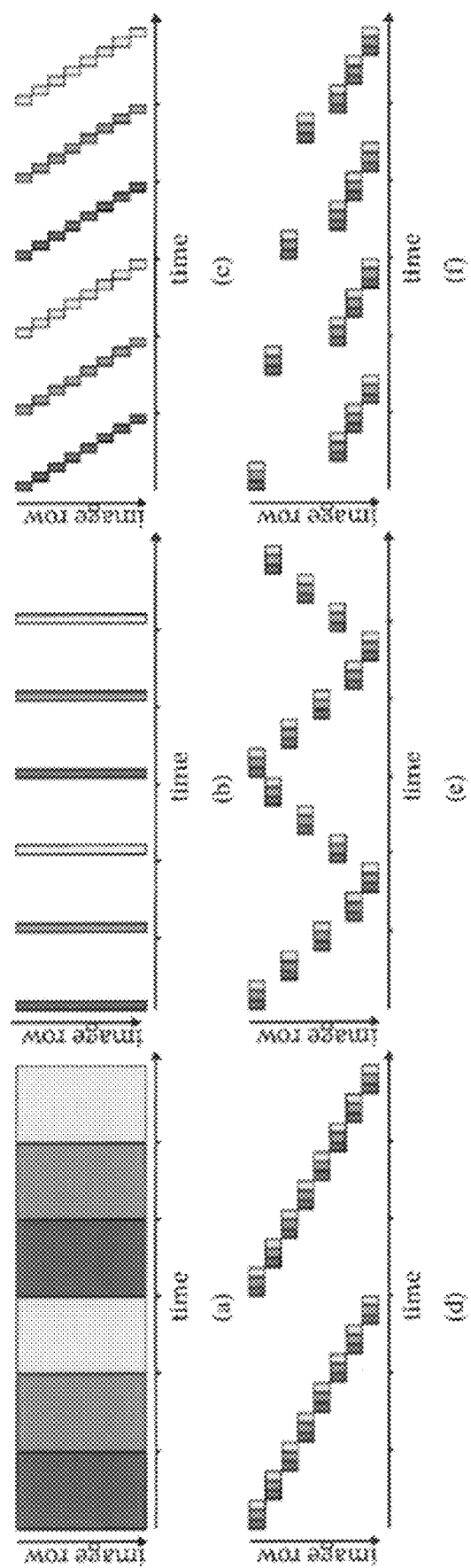
FIGS. 3(*a*)-3(*f*) shows several possible epipolar plane sampling schemes and row exposures in ToF imaging.

FIG. 3 illustrates several such ordering schemes. FIG. 3(*a*) shows conventional prior art ToF, wherein all epipolar planes are illuminated simultaneously and all camera rows are exposed at the same time. This requires long exposures and leads to severe artifacts due to motion, ambient light, global light transport and interference between devices. FIG. 3(*b*) shows that sending a very brief, high-intensity pulse of light for CW-ToF confers resistance to ambient light, but it is still prone to artifacts due to global light transport and motion.

FIG. 3(*c*) shows an ordering the epipolar ToF planes which produces an effect similar to a rolling-shutter camera, where one complete image is acquired for each modulation phase. This results in robustness to ambient light, global illumination and motion blur. Sensitivity to motion remains, however, because of the significant delay between the multiple phase measurements acquired for each row. This scheme is undesirable because if the scene or camera move while acquiring these images, the recovered depth map will contain hard to correct errors.

Another embodiment in FIG. 3(d) shows that interleaving measurements plane by plane minimizes such artifacts. The ordering strategy shown in FIG. 3(d) loops through the set of modulation phases one epipolar plane at a time. Because the exposure time of each row is very short, all phases required for a single row can be acquired quickly enough to minimize depth and motion blur artifacts due to camera/scene motion.

Using this strategy, each row is captured at a slightly different time. Although this induces a rolling shutter-like effect in the acquired depth map, the individual depth values will be blur- and artifact-free and can be combined into a consistent model by post-processing.

To make such post-processing even easier while obeying the kinematic constraints of the mirror's actuator, epipolar planes are ordered in a sawtooth pattern, as shown in FIG. 3(e). In this scheme, the entire field of view is scanned twice within the same total exposure time, yielding a higher temporal sampling of the scene and making consistent merging of individual depth map rows easier. This essentially provides full field-of-view depth maps at twice the frame rate but half the vertical resolution, making depth correction easier for fast camera shake and/or scene motions.

More generally, FIG. 3(f) shows that, for certain applications, scanning different portions of the field of view with different temporal sampling rates can be beneficial. An example of a non-uniform sampling scheme in which epipolar planes corresponding to lower image rows are sampled more frequently is shown. This type of sampling could be useful, for example, on a vehicle where lower portions of the field of view are usually closer and move faster, requiring acquisition at a faster sampling rate.

In operation, the projector generates a sheet of modulated laser light and sequentially illuminates epipolar planes defined between the laser projector and the sensor. The planes may be illuminated in any order, but, in a preferred embodiment, are illuminated from top-to-bottom and then bottom-to-top. The actual order in which the planes are illuminated may be dependent upon the particular environment in which the platform is being used or the application for which the depth map is being created. Also, any number of planes may be defined within the field-of-view, limited only by the capabilities of the laser and the sensor, and the desired frame rate. In a preferred embodiment, there are 240 planes defined in the field-of-view, with each plane being 320×240 pixels.

The region of interest of the sensor can be set to any portion of the field-of-view and, in operation, a microcontroller synchronizes the laser projector and the sensor such that the ROI of the sensor is set to sense a row of pixels within the currently illuminated epipolar plane. Phase is estimated using two images. In general, the sensor uses 4, measurements for correlating the incoming signal with shifted input signals (angles 0, 90, 180, 270). Either 2 or 4 of these images can be used for phase estimation, however, using 4 images gives more accuracy but takes longer to capture and reduces frame rate. If phase unwrapping is necessary, the phase estimation process will need to be performed at different modulation frequencies, and, as such, 4 images instead of 2 images will be required for phase unwrapping. In certain embodiments of the invention, an inertial measurement unit (IMU) may be attached to the sensor and is used to compensate for motion of the platform.

Epipolar ToF Prototype

A prototype device for epipolar ToF imaging, shown in FIG. 4(a) was constructed using a galvomirror-based light sheet projector for illumination and a ToF sensor with adjustable region of interest for imaging. FIG. 4 is a depiction of the prototype. A DME660 camera with fast ROI control to capture arbitrary rows of pixels, and a custom-built, steerable light sheet projector as the light source were used in the prototype. It should be realized by one of skill in the art that the prototype described herein is only an exemplar of one particular embodiment of the invention, and that other embodiments utilizing different equipment and operational parameters fall within the scope of the invention.

The ToF sensor used is the EPC660 (from Espros Photonics) which has a resolution of 320×240 and the pixels implement ambient saturation prevention. The sensor is fitted with an 8 mm F1.6 low distortion lens and an optical bandpass filter (650 nm center frequency, 20 nm bandwidth). The sensor allows the ROI to be changed with every sensor readout and this feature is used to select different rows to image. To read data out of the sensor, the sensor development kit (DME660) from the manufacturer is utilized. It should be realized that the invention is not limited to the use of the described ToF sensor, but that any ToF sensor might be used.

The line projector utilized for the prototype uses a 638 nm laser diode with a peak power of 700 mW as its light source. Light from the diode is collimated and passed through a Powell lens that stretches the beam cross-section into a diverging, almost uniformly illuminated straight line with a 45 degree fanout angle. The laser light is directed at a 1D scanning galvomirror that can be rotated to deflect the sheet. The rotational range of the mirror gives the projector a 40 degree vertical field of view. The projector's effective center of projection moves as the mirror rotates, but because the distance between the fanout point and the galvomirror is very small compared to depths in the scene, this effect can be ignored.

Figure 10:
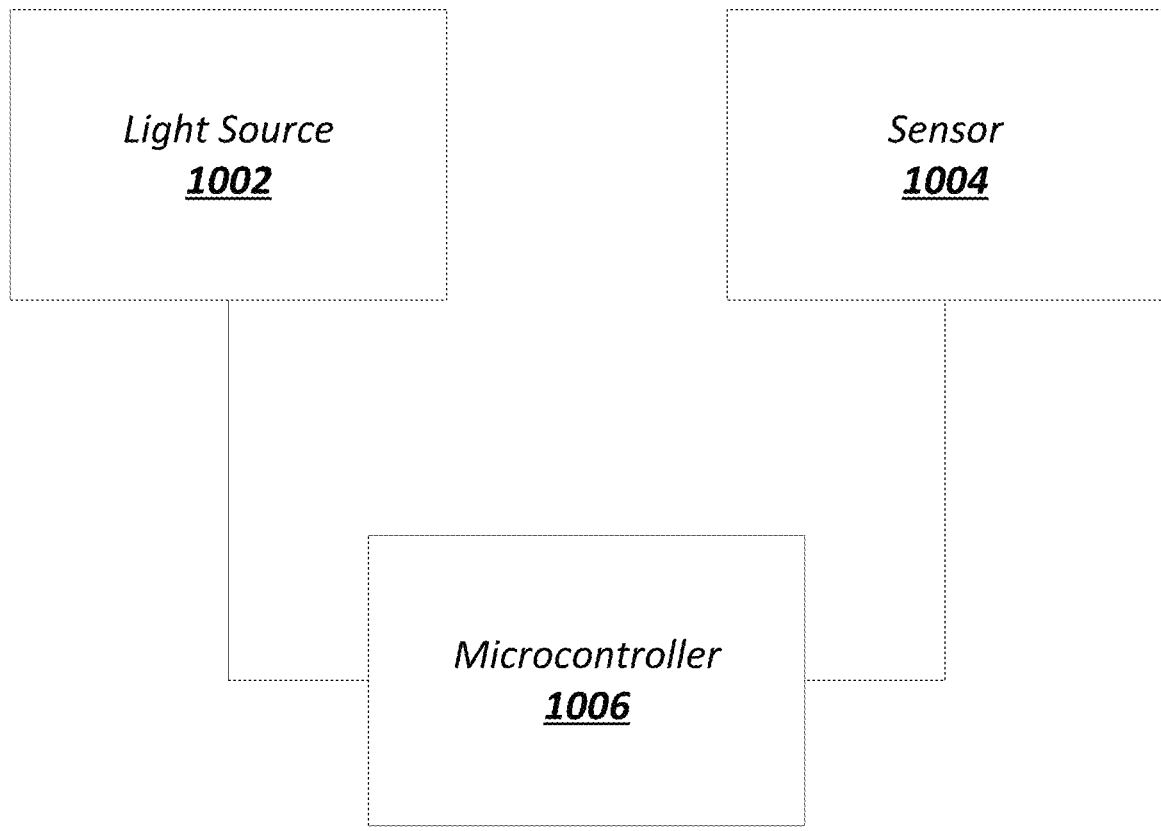
FIG. 10 is a block diagram showing components of an exemplary system implementing the present invention.

A block diagram of the system components is shown in FIG. 10. A microcontroller 1006 is used to synchronize the sensor 1004 and light source 1002. The microcontroller 1006 may communicate with the sensor 1004 over an I2C bus to set the exposure time, modulation frequency/phase, region of interest, row and to trigger each capture. The microcontroller 1006 may also actuate the projector's galvomirror. In addition, the microcontroller 1006 can read the camera's rotational velocity using a MEMs inertial magnetic unit (IMU) that is attached to the sensor 1004. A frequency generator circuit allows the selection of a modulation frequency (between 11 MHz and 24 MHz in steps of 1 MHz).

The projector and camera are aligned side-by-side in a rectified stereo configuration, as required for epipolar imaging. When correctly aligned, the projected light sheet illuminates a single row of pixels in the camera, and this row is independent of depth. A mirror calibration is performed to determine the mapping between the galvomirror angle and the illuminated camera row.

Sensor Calibration

In practice, the measurements read out from the sensor, as observed, do not match their expected values. There are a number of reasons for this discrepancy, including fixed pattern noise, unequal sensitivity and crosstalk between taps and variations in the phase of the actual exposure modulation function at each pixel. The relation between the expected sensor measurements $I_\omega(x)$ and the observed measurements $\hat{I}_\omega(x)$ is modelled using a projective correction $H_\omega(x)$ at each pixel.

$$\begin{bmatrix} I_{\omega,0} \\ I_{\omega,\frac{\pi}{2}} \\ 1 \end{bmatrix} = H_\omega(x) \begin{bmatrix} \hat{I}_{\omega,0} \\ \hat{I}_{\omega,\frac{\pi}{2}} \\ 1 \end{bmatrix} \quad (4)$$

To find $H_\omega(x)$, the sensor is placed fronto-parallel to a planar surface at a set of known distances $z_k$, k=1, ..., K. For each position of the plane, sensor measurements are collected at different aperture settings (s=1, ... S) to simulate the effect of varying scene albedos. For each plane position k, the path length can be computed at a pixel $l_k(x)$ and from it the expected phase $$\frac{2\omega l_k(x)}{c}.$$

The $H_\omega(x)$ that best explains the sensor measurements $I_{\omega,k,s}(x)$ can be computed by finding the correction $H_\omega(x)$ that minimizes the least square error between the corrected measurements and the expected phase.

These calibration parameters are dependent on both modulation frequency and exposure time so the process is repeated for all the frequencies and exposure times. Although the modulation signals passed to the sensor and light source driver are square waves, at modulation frequencies of 20 MHz and above, the harmonics were largely suppressed and so the modulation functions were well approximated by sinusoids.

Timing

The time needed to image a row (and by extension the frame rate) with the prototype is a function of n, the number of readouts per row, exposure time $t_{exp}$, the readout time for a row $t_{read}$ and $t_{mirror}$, the time taken by the galvomirror to move to the next row position in the sampling sequence.

$$t_{row} = nt_{exp} + (n-1)t_{read} + \max(t_{read}, t_{mirror}) \quad (5)$$

Figure 5:
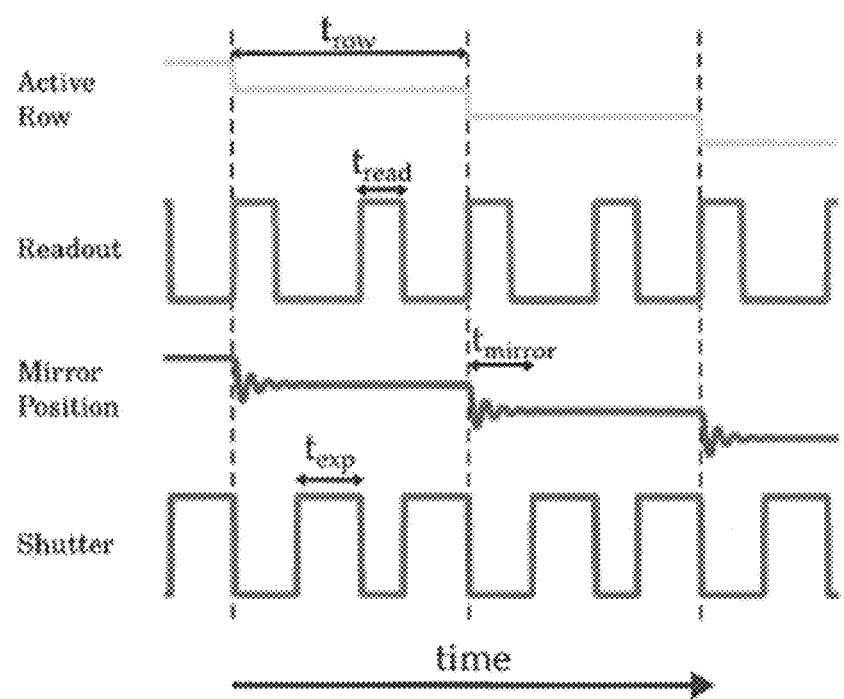
FIG. 5 shows timing diagrams for camera exposure, readout and mirror position for a particular sequence of the rows.

With a two-tap sensor like the one used in our prototype, at least n=2 readouts are needed to measure depth using a single modulation frequency. FIG. 5 shows timing diagrams for camera exposure, readout and mirror position for a particular sequence of the rows. First, the scanning mirror is moved to the new active row and takes $t_{mirror}$ time to settle in the position. When the previous row readout is complete (which takes $t_{read}$ time) and the mirror is in position, the camera is triggered. In this example, $t_{mirror} > t_{read}$, so the speed of the mirror is a bottleneck for capture rate. Each exposure lasts for time $t_{exp}$ and at the end of each exposure the row is read. FIG. 5 shows a timing example. $t_{row}$ is 175 µs and $t_{exp}$ is set to 100 µs. In a row sampling sequence, the mirror rotates through two rows (approximately) 0.33° per step and the settling time $t_{mirror}$ for this step size is roughly 100 µs. In total, $t_{row}$ works out to 550 µs when n=2, which yields a framerate of 7.5 fps (3.8 fps when n=4).

Limitations

Currently, the main bottleneck for the frame rate is the readout time. Embodiments of the present invention need data from only one row of the sensor per readout, but the smallest region of interest the EPC660 sensor supports is 4 rows tall, the reading of 4 rows is forced when in actuality, only one row is used. In addition, the development kit limits the sensor data bus to 20 MHz, but the sensor itself supports bus rates up to 80 MHz. The minimum value of $t_{exp}$ depends on the peak power of the light source and desired range. The described prototype of the present invention has a source with a peak power of 700 mW, while most other experimental time-of-flight systems have a peak light source power in the 3 W to 10 W range. With a brighter light source, a shorter exposure time could be used without loss of range. Lastly, the low cost galvomirror could be replaced with a faster 1D MEMs mirror. With these improvements, a system based on the described prototype would operate at video frame rates.

The sensor used in the described prototype supports a maximum modulation frequency of only 24 MHz, whereas most other time-of-flight sensors can run in the 50 MHz to 100 MHz range. This limits the ability of the prototype to accurately scan smaller objects or to be used for transient imaging. The EPC660 datasheet specifies that the sensor ADC returns 12 bit values, but the version of the sensor which was used returns only 10 bits, which effects range and makes the output depth maps noisier.

Results

To run the sensor in regular imaging mode for comparing performance under ambient light and global illumination, the entire sensor is exposed at once instead of using a small ROI and the sensor is left exposed until the sheet projector has finished a sweep across the field of view. For regular ToF imaging in the multi-device interference and camera motion experiments, the sheet projector can be replaced with a diffused source.

Ambient Light

Figure 7:
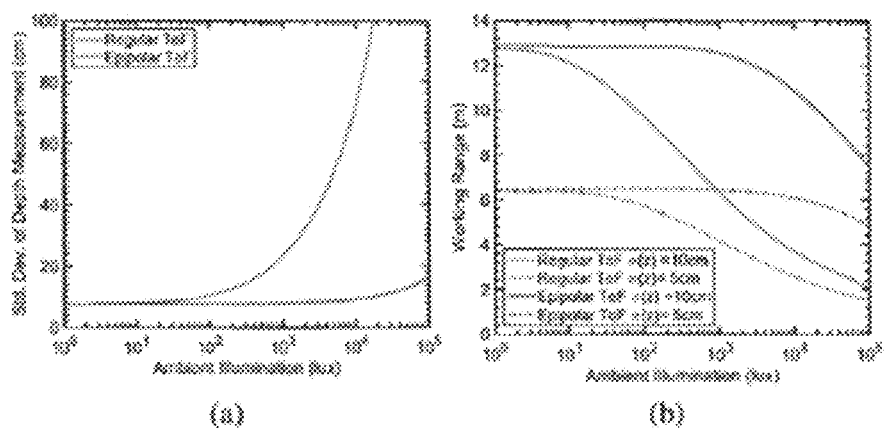
FIG. 7(*a*)-7(*b*) are graphs showing (a) the standard deviation in depth measurements obtained using regular and epipolar ToF imaging; and (b) the working range of the same simulated camera at different levels of acceptable range accuracy. Note that the simulated camera's parameters differ from the prototype.

The benefits of applying epipolar imaging to time-of-flight in brightly lit environments were simulated, and the results shown in FIG. 7. For a given light source power, with regular imaging, depth accuracy degrades rapidly as ambient light levels increase from 0 lx (complete darkness) to 100 klx (direct sunlight). With epipolar imaging, the degradation is much more gradual.

FIG. 7(a) shows the results of a simulation of the standard deviation in depth measurements obtained using regular and epipolar ToF imaging (15 MHz modulation frequency) for a target 10 m from the camera as a function of ambient light level. For both cases, the peak light source power is 2W and the total exposure time is the same (7.2 ms per image), but epipolar ToF is more robust to ambient light because it concentrates light source power and uses a short exposure for each row (30 µs).

FIG. 7(b) shows the working range of the same simulated camera at different levels of acceptable range accuracy. Note that the simulated camera's parameters differ from the prototype.

Figure 1:
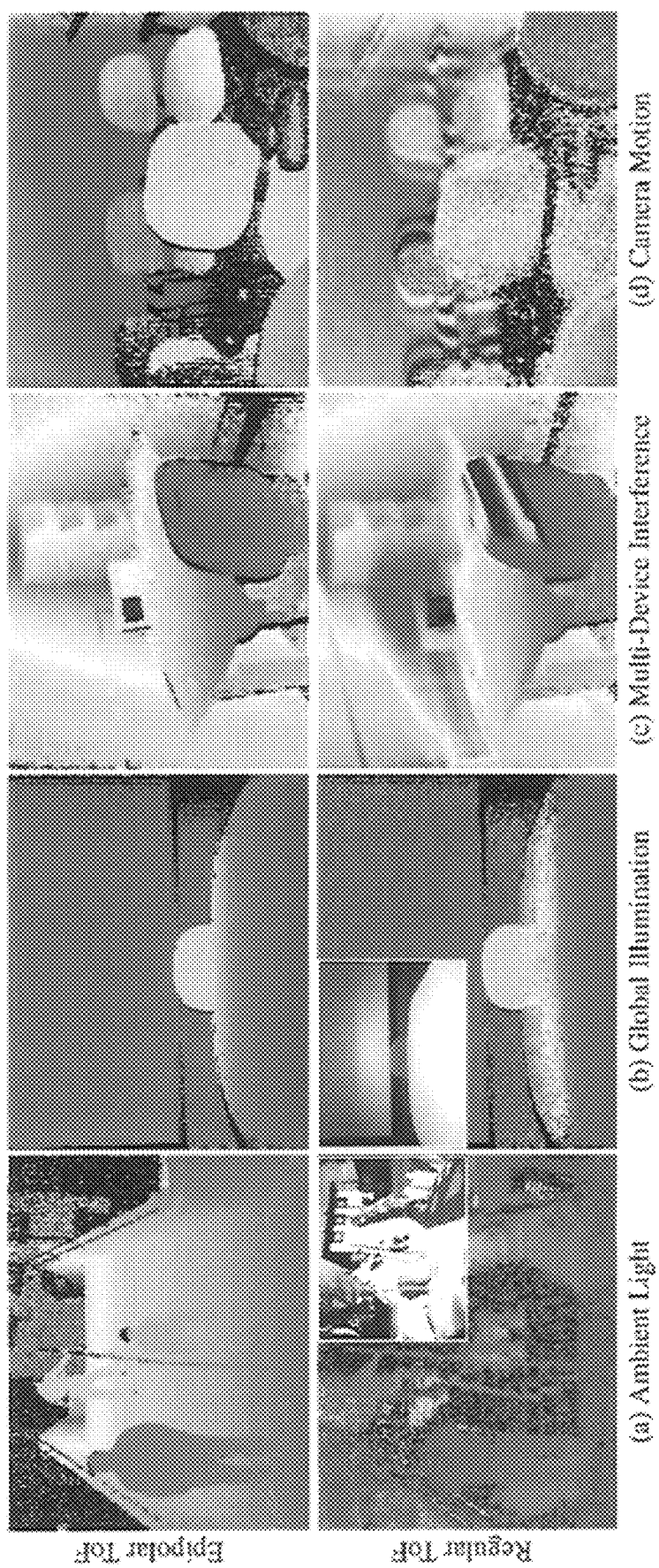
FIGS. 1(a)-1(d) show a comparison of various scenes scanned using a regular (ToF) system versus the epipolar ToF system of the present invention.
Figure 6:
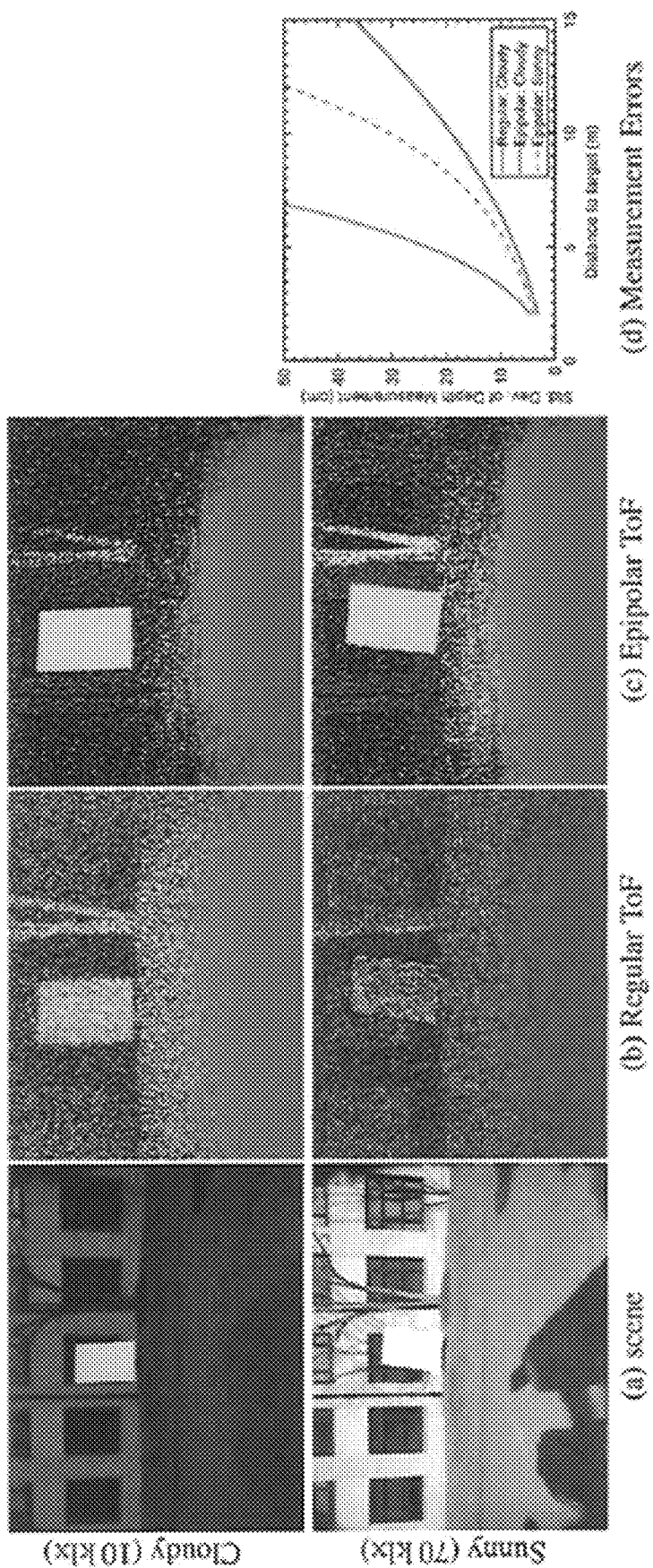
FIG. 6(*a*)-6(*d*) shows the results of imaging a white planar target at a range of distances from the sensor in cloudy weather and bright sunshine.
Figure 8:
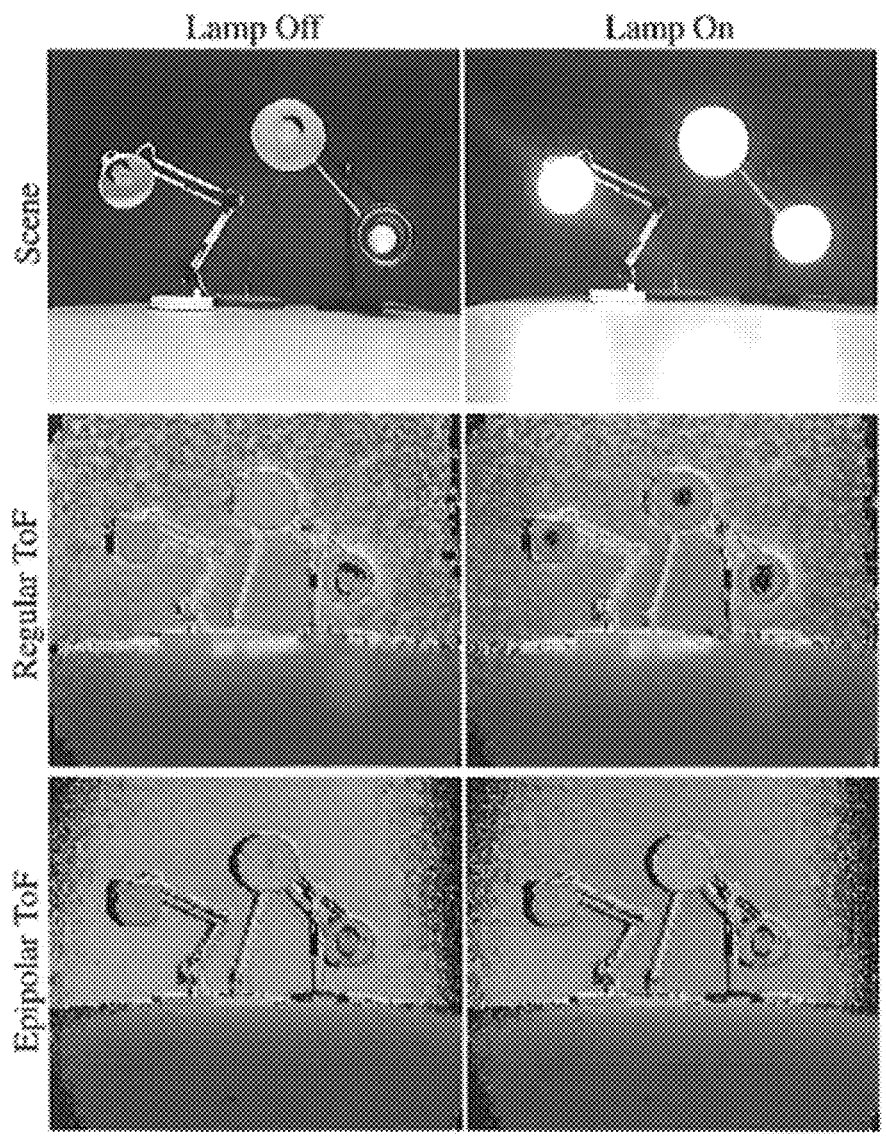

FIG. 6 quantitatively compares the described prototype in regular ToF and epipolar ToF modes in cloudy and sunny conditions. Regular ToF mode fails in bright sunlight, while epipolar ToF is considerably more robust. FIG. 1(a) shows a live 3D CW-ToF imaging in sunlight (70 klx) with 15 m range (people walking on stairs, phase wraps around distant building), and FIG. 8 shows an example scene with both strong ambient light and global illumination effects. Reflections from the table service cause errors with regular ToF, but these are suppressed with epipolar imaging.

FIG. 6(d) shows standard deviation in depth measurements versus distance to target (slower rising curves are better). The prototype of the present invention has depth error of around 3% at 10 m in bright sunlight.

Global Illumination

Figure 9:
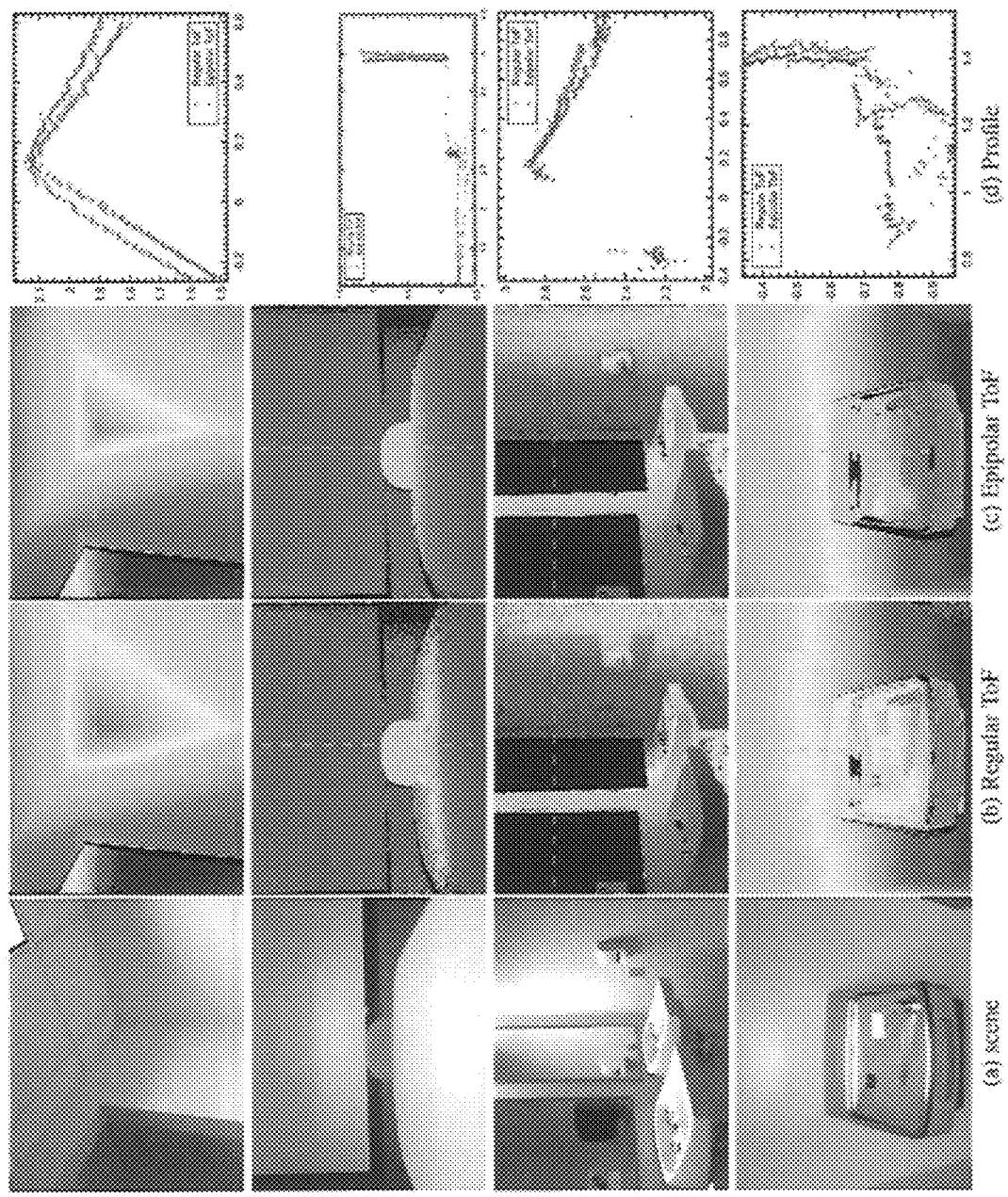
FIG. 9 compares depth maps with epipolar and regular ToF imaging in the presence of global light transport.

FIG. 9 demonstrates the ability of epipolar imaging to suppress the effects of global illumination in a few common indoor environments. These results are generated using a single modulation frequency (24 MHz). At the corner of the room, diffuse inter-reflections between the walls and ceiling cause depths to be overestimated and a rounding out of the corner with regular imaging.

The conference table in the second row of FIG. 9, also shown in FIG. 1(b), appears specular at grazing angles. In the bathroom scene, the ghosting on the wall due to reflections from the mirror is suppressed by epipolar imaging. The water fountain is particularly challenging because the direct return from its metallic surface is very weak, but the surface reflects a lot of indirect light back to the sensor. For epipolar imaging, 3 exposures are combined to try to recover a useable direct signal. Longer exposures do not help regular imaging because the inter-reflections cause the sensor to saturate.

With epipolar imaging, the walls appear straight and meet at a sharp right angle diffuse inter-reflections at the corner, glossy inter-projections from the projection screen onto a shiny conference table, reflections from the mirrors in the restroom and in between the wall and the shiny water fountain. Epipolar ToF eliminates most of the global light transport, resulting in depth maps that are significantly more accurate than regular ToF.

Multi-Camera Interference

With epipolar CW-ToF imaging, two cameras running at the same modulation frequency can usually only interfere with each other at a sparse set of pixels in each image. Each camera illuminates and images a single line in the scene at a time, so at any point of time the second camera can only interfere with the first camera at the points where its illuminated line intersects with the first camera's exposed row of pixels. A degenerate case occurs when the light source of one camera forms a rectified stereo pair with the sensor of the second camera and both cameras happen to be synchronized, but this can be considered a rare occurrence.

If more than two cameras are present, each pair of cameras has a sparse set of points where they interfere with each other. When a set of epipolar ToF cameras are running at different modulation frequencies, the contribution of each camera to shot noise in the other cameras is greatly reduced. FIG. 1(c) shows the result of operating two CW-ToF cameras simultaneously at the same frequency with regular and epipolar imaging. Epipolar imaging shoes the lack of interference between ToF devices operating at the same frequency. There are observable errors (i.e., the wall and chair) with regular ToF.

Camera Motion

With a rotating camera having a known rotational trajectory (obtained from a MEMS gyroscope), with regular imaging, each captured ToF measurement has motion blur and strong artefacts at depth discontinuities because the measurements are not aligned to each other. In theory, these could be collected using a spatially varying deconvolution but this is computationally expensive and does a poor job of recovering high frequency components. With epipolar ToF imaging, motion blur has basically no effect and a depth map with a rolling shutter like effect is acquired. This can be corrected with a simple image warp computed from the rotation. FIG. 1(d) shows an example from a rapidly panning camera, showing that non-distorted depth maps can be obtained even in the presence of severe camera shake during scene exposure (hard-to-remove ghosting errors in regular ToF can be observed). Further, as previously mentioned, the sensor may be equipped with and I am you, which is used to compensate promotion of the platform.

Epipolar imaging for time-of-flight depth cameras mitigates many of the problems commonly encountered with depth cameras, such as poor performance in brightly lit conditions, systemic errors due to global illumination, inter-device interference and errors due to camera motion. Compared to depth cameras, systems like scanning LIDAR that illuminate and image a single point at a time are very robust to all these effects but have a low measurement rate. Epipolar imaging can be thought of a compromise between these two extremes of full-field capture and point-by-point capture. Because epipolar imaging illuminates and captures a single line at a time, it allows a depth camera to have most of the robustness of point scanning while still having a high measurement rate.

Cycling through patterns row-by-row, as is done here for ToF, is directly applicable to structured light as well. It would make it possible to apply multi-image structured light methods that generate high quality depth maps to dynamic scenes where currently only single-shot methods can be used.

In the described prototype, the scanning mirror follows a sawtooth pattern and captures rows in an orderly sequence. However, with a faster scanning mirror, pseudo random row sampling strategies could be implemented that might allow epipolar imaging to be used in conjunction with compressed sensing or similar techniques to recover temporally super-resolved depth maps of fast moving scenes. Embodiments of the invention have been described herein using specific identified components, however, the invention is not meant to be limited thereby. The scope of the claimed invention is defined by the claim set presented below.

We claim:

1. A system comprising:
   a modulated light source for projecting a steerable sheet of modulated light into a field-of-view;
   a sensor having a selectable region of interest, the modulated light source and sensor in a rectified stereo configuration such that the steerable sheet of modulated light lies in an epipolar plane between the modulated light source and the sensor; and
   a microcontroller for synchronizing the modulated light source and the sensor such that the selected region of interest of the sensor is set to a portion of the field-of-view containing the epipolar plane currently illuminated by the steerable sheet of modulated light.

2. The system of claim 1, wherein the modulated light source comprises:
   a laser source;
   an optical element, configured to generate the steerable sheet of modulated from a collimated output of the laser source; and
   a means for steering the sheet of modulated light along a series of epipolar planes between the projector and the sensor.

3. The system of claim 2 wherein the means for steering the sheet of modulated light is selected from a group comprising a rotatable galvomirror and a MEMS mirror.

4. The system of claim 2, wherein the sensor is a continuous wave time-of-flight camera having a controllable region of interest.

5. The system of claim 4, wherein the steerable sheet of modulated light illuminates a single row of pixels in the sensor, and further wherein the controllable region of interest of the sensor is set to sense the single row of illuminated pixels.

6. The system of claim 1, wherein the sensor captures at least two images from each illuminated epipolar plane.

7. The system of claim 1 wherein the steerable sheet of modulated light is modulated as a repeating wave and further wherein a sensed depth may be calculated for each sensed pixel based on phases of the returned reflections.

8. The system of claim 7 wherein a depth map of the entire field of view is created based upon the depth calculated for each sensed pixel from each illuminated epipolar plane within the field-of-view.

9. The system of claim 2, wherein the microcontroller reads data from the sensor regarding the previously illuminated epipolar plane while the means for steering the sheet of modulated light moves the steerable sheet of light such as to illuminate a next epipolar plane in the series of epipolar planes.

10. A method comprising:
projecting a sheet of modulated light along a series of epipolar planes defined by a modulated light source and a sensor placed in a rectified stereo configuration, the series of epipolar planes defining a field-of-view; and
imaging a single row of illuminated pixels in an epipolar plane currently illuminated by the sheet of modulated light; and
synchronizing the modulated light source and the sensor, such that a region of interest of the sensor is set to a portion of the field-of-view containing an epipolar plane currently illuminated by the sheet of modulated light.

11. The method of claim 10, further comprising:
determining a depth of each pixel in the single row of illuminated pixels;
wherein determining the depth of each pixel comprises calculating the depth of each pixel based on a phase of the reflected light from each pixel.

12. The method of claim 11 wherein calculating the depth of each pixel in an illuminated epipolar plane further comprises determining a difference in phase of reflected light contained in two or more separate images of the illuminated epipolar plane.

13. The method of claim 11, further comprising creating a depth map based on the depth of each pixel in each illuminated epipolar plane within the defined field-of-view.

14. The method of claim 10 wherein the epipolar planes in the field-of-view are illuminated in a varying order.

15. The method of claim 10 wherein the modulated light source comprises:
a laser source;
an optical element, configured to generate a light sheet from a collimated output of the laser source; and
a means for steering the light sheet of laser light along a series of epipolar planes between the modulated light source and the sensor.

16. A non-transitory computer-readable media containing software that when executed, performs the functions of:
projecting a sheet of modulated light along a series of epipolar planes defined by a modulated light source and a sensor placed in a rectified stereo configuration, the series of epipolar planes defining a field-of-view;
imaging a single row of illuminated pixels from each epipolar plane in the series of epipolar planes as each epipolar plane is illuminated by the projected sheet of modulated light; and
synchronizing a modulated light source projecting the sheet of modulated light and a sensor imaging the single row of illuminated pixels, such that a region of interest of the sensor corresponds to a currently illuminated epipolar plane.

17. The non-transitory computer-readable media of claim 16, wherein the software performs the further function of:
determining a depth of each pixel in the single row of illuminated pixels;
wherein determining the depth of each pixel comprises calculating the depth of each pixel in an illuminated epipolar plane by determining a difference in phase of reflected light contained in two or more separate images of the illuminated epipolar plane.

18. The non-transitory computer-readable media of claim 16 wherein the epipolar planes in the field-of-view are illuminated in a varying order.

19. The method of claim 16 wherein the modulated light source comprises:
a laser source;
an optical element, configured to generate the sheet of modulated light from a collimated output of the laser source; and
a means for steering the sheet of modulated light along a series of epipolar planes between the modulated light source and the sensor.

20. The non-transitory computer-readable media of claim 17 wherein the software performs the further function of:
creating a depth map based on the depth of each pixel in each illuminated epipolar plane within the defined field-of-view.

* * * * *